US009289005B1

(12) United States Patent
Martin et al.

(10) Patent No.: US 9,289,005 B1
(45) Date of Patent: Mar. 22, 2016

(54) FROZEN TREAT MOLD SYSTEM

(71) Applicants: Therese Martin, Sandy, UT (US);
Nathan Martin, Sandy, UT (US)

(72) Inventors: Therese Martin, Sandy, UT (US);
Nathan Martin, Sandy, UT (US)

( * ) Notice: Subject to any disclaimer, the term of this patent is extended or adjusted under 35 U.S.C. 154(b) by 53 days.

(21) Appl. No.: 14/057,318

(22) Filed: Oct. 18, 2013

Related U.S. Application Data

(60) Provisional application No. 61/769,339, filed on Feb. 26, 2013.

(51) Int. Cl.
| | |
|---|---|
| *A23G 9/04* | (2006.01) |
| *A23G 9/08* | (2006.01) |
| *A23G 9/44* | (2006.01) |
| *A47G 19/22* | (2006.01) |
| *A23G 3/56* | (2006.01) |
| *A23G 9/26* | (2006.01) |
| *A47G 21/18* | (2006.01) |
| *A23G 9/22* | (2006.01) |

(52) U.S. Cl.
CPC ............... *A23G 9/083* (2013.01); *A23G 3/563* (2013.01); *A23G 9/221* (2013.01); *A23G 9/26* (2013.01); *A23G 9/44* (2013.01); *A47G 19/2205* (2013.01); *A47G 19/2222* (2013.01); *A47G 19/2272* (2013.01); *A47G 21/18* (2013.01)

(58) Field of Classification Search
CPC ........... A23G 9/26; A23G 9/44; A23G 9/221; A23G 3/503; A23G 9/083; A23G 3/563; A47G 19/2222; A47G 19/2205; A47G 19/2272; A47G 21/18
USPC .............. 425/117, 468; 249/92, 93, 120, 121, 249/122, 127; 220/705, 709
See application file for complete search history.

(56) References Cited

U.S. PATENT DOCUMENTS

| | | | | |
|---|---|---|---|---|
| 2,949,453 | A | * | 8/1960 | Sarett ............................... 540/35 |
| 4,239,175 | A | | 12/1980 | Straubinger |
| 5,044,512 | A | * | 9/1991 | Giancaspro et al. ........... 220/709 |
| 5,167,354 | A | * | 12/1992 | Cohanfard .................. 224/148.2 |
| 5,328,069 | A | * | 7/1994 | Cohanfard .................. 224/148.2 |
| 5,515,998 | A | | 5/1996 | Wang |
| 6,032,825 | A | | 3/2000 | Guthrie |
| 6,182,854 | B1 | | 2/2001 | Jimenez et al. |
| 6,565,899 | B1 | | 5/2003 | Cecere |
| D547,926 | S | | 8/2007 | Rainford et al. |
| 2006/0054629 | A1 | * | 3/2006 | Ronn et al. ..................... 220/705 |
| 2008/0128529 | A1 | * | 6/2008 | Fernandez ........................ 239/33 |
| 2012/0247998 | A1 | * | 10/2012 | Wahl .......................... 206/459.5 |

\* cited by examiner

*Primary Examiner* — Seyed Masoud Malekzadeh
(74) *Attorney, Agent, or Firm* — RG Patent Consulting, LLC; Rachel Gilboy

(57) ABSTRACT

An apparatus including a container for a frozen confection treat allowing the treat to be frozen and later to be consumed in a frozen state as a popsicle as well as allowing the treat to be consumed in a melted state via a combination-lid-straw. The treat may also be consumed via a spoon-end attached to a straw-lower-section. The combination-lid-straw may be solid or have a continuous through-hole therethrough.

13 Claims, 7 Drawing Sheets

FROZEN TREAT MOLD SYSTEM

CROSS-REFERENCE TO RELATED APPLICATION

The present application is related to and claims priority from prior provisional application Ser. No. 61/769,339, filed Feb. 26, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of frozen confection holders and more specifically relates to a frozen treat mold system.

2. Description of the Related Art

Many people, young and old, enjoy frozen confection treats, many times referred to as popsicles. The popsicle was invented by eleven year old Frank Epperson in 1905. While living in San Francisco, Epperson had been mixing soda from a powdered mix and he accidentally left the cup with its contents, along with the stirring stick, out on the porch over night. That evening, temperatures reached a record low and the cup of soda froze solid. He discovered the frozen drink the next morning. Eighteen years later Epperson applied for a patent for a "frozen ice on a stick" which he called the Epsicle ice pop. His children renamed it popsicle. Years later, during the depression, twin popsicles (two popsicles joined together, each having an individual stick) were invented.

Whatever one may choose to call them, the frozen confections taste great and hit the spot on hot summer days or whenever a person just wants to enjoy a cooling snack. Most off-the-shelf popsicles sold in stores and those sold by vendors driving through the neighborhood are small flavored icicles on a stick wrapped in paper. Although they taste great, it is often challenging trying to eat the popsicle completely before it starts melting and making a mess. When a mother buys popsicles for each of her children, it can be a race to find out if the children can finish the popsicle before it melts enough to fall off the stick and land on the ground.

To help save money on popsicles, many creative mothers have figured out they can freeze flavored water in ice cube trays and similar devises to make 'homemade' popsicles. Children enjoy these treats, but they are so small compared to commercial popsicles that many times the children come back wanting more, and the cycle continues.

Whatever methods mothers use to provide these frozen treats for their children, they discover one continuing problem—melting that causes waste and mess. The waste becomes costly and the mess can be difficult to clean due to the sticky nature of the popsicle. It is desirable that a method and means for making popsicles and other frozen treats be available to help defray costs and provide users the ability to eat a homemade frozen confection in such a manner that allows them to consume it in a frozen state as well as in a thawing state without having dripping from the frozen confection resulting in a sticky mess.

Various attempts have been made to solve the above-mentioned problems such as those found in U.S. Pub. No. 6,182,854 to Matthew R. Jimenez et al, U.S. Pat. No. 5,515,998 to Paul S. Wang, U.S. Pat. No. 4,239,175 to Paul Straubinger, U.S. Pat. Design No. D547,926 to Joy J. Rainford et al, U.S. Pat. No. 6,565,899 to Al Louis Cecere, and U.S. Pat. No. 6,032,825 to Christopher I. Guthrie. This art is representative of frozen confection holders. None of the above inventions and patents, taken either singly or in combination, is seen to describe the invention as claimed.

Ideally, a frozen treat mold system should provide a container for a frozen treat allowing the treat to be consumed in a frozen state as a popsicle as well as alternately allowing the treat to be consumed in a melted state via a straw and, yet would operate reliably and be manufactured at a modest expense. Thus, a need exists for a reliable frozen treat mold system to avoid the above-mentioned problems.

BRIEF SUMMARY OF THE INVENTION

In view of the foregoing disadvantages inherent in the known frozen confection holders art, the present invention provides a novel frozen treat mold system. The general purpose of the present invention, which will be described subsequently in greater detail is to provide a container for a frozen treat allowing the treat to be consumed in a frozen state as a popsicle as well as allowing the treat to be consumed in a melted state via a straw.

The frozen treat mold system will be appreciated by mothers wanting to prepare a frozen treat for their family members, and the family members will enjoy consuming the treat without making a mess. It allows a person to eat the frozen treat while holding it by a handle or use a spoon fixed on the lower end of the straw to scoop out the frozen treat. If they choose to allow the treat to melt, they will be able to enjoy consuming it through a straw. Thus, an individual is able to consume all or part of the frozen treat at one sitting. However, if they choose to consume part of the treat and save the remainder for later, they are able to return the treat mold into a freezer and allow it to refreeze for later use.

A frozen treat mold system is disclosed, in a preferred embodiment, comprising a frozen-treat-mold-assembly comprising a container housing having a cup with an inner volume and an outer-surface. The container housing further comprises a flexible mold for freezing flavored liquids into a frozen state thereby comprising a frozen treat.

The container housing outer surface in preferred embodiments comprises a round bottom-surface, a side incliningly-rising (sloped/graduated) from the round bottom-surface, and a top-opening. The top-opening is inclined suitably for opening with relative ease despite expansion of a liquid treat when frozen because of decreased surface area of the inner volume contacting the (frozen) a liquid treat as being removed due to the side incliningly-rising from the round bottom-surface. The container housing preferably comprising flexible molded plastic is suitable to contain and form a liquid treat when frozen and, through flexing the container housing, able to loosen the contents so the frozen treat may be consumed as a popsicle when it is removed from the container housing. The device is non-disposable in preferred embodiments.

The frozen-treat-mold-assembly further comprises a combination-lid-straw. The combination lid-straw comprises in combination a straw-upper-section with a top hole, a container-lid having a lifting tab, a straw-lower-section with a bottom-hole having a spoon-end, and a straw-cap having a cap-opening, a cap-volume, and a retaining-clip. Certain embodiments may comprise a combination-lid-straw that is solid; others may comprise a continuous through-hole.

The combination lid-straw comprises rigid (yet slightly flexible) material allowing the straw-upper-section with a top hole to serve as a handle allowing a user to eat the frozen treat as a popsicle. The combination lid-straw is removably attachable to an upper portion of the outer-surface of the cup via placing the container-lid having a lifting tab on an upper-periphery of outer-surface, with the lifting tab being useful for removing the container-lid from the cup as desired.

The straw-upper-section with the top hole is attached to a top-side of the container-lid having the lifting tab, and the straw-lower-section with the bottom-hole having a spoon-end is attached to a bottom-side of the container-lid. Both the straw-upper-section with the top hole and the straw-lower-section with the bottom-hole having the spoon-end may be hollow. Thus, the straw-upper-section with the top hole and the straw-lower-section with the bottom-hole having the spoon-end is able to be used in the capacity of a straw for consuming the frozen treat as it thaws.

The spoon-end of the straw-lower-section with the bottom-hole is contoured in such a manner as to allow the user to scoop a portion of the frozen treat for consumption. The straw-cap is removably attachable to a top-portion of the straw-upper-section to prevent spilling contents of the cup via inserting the top hole of the straw-upper-section into the cap-volume and attaching the retaining-clip to the straw-upper-section.

The frozen treat mold system further comprises a container-holding-ring and a lanyard-assembly in preferred embodiments to serve as a carrier for the container housing. The container-holding-ring comprises flexible material able to fit around a perimeter of the container housing as a sheath, thereby allowing the container housing to be carried in a hands-free manner when used in combination with the lanyard-assembly.

The lanyard-assembly comprises a strap, and a pair of holding-clasps. The strap comprises a length, a strap-first-end, and a strap-second-end, thereby defining the strap. The pair of holding-clasps comprise a first-clasp attached to the strap-first-end and a second-clasp attached to the strap-second-end. Each of the holding-clasps preferably comprise plastic swivel J-hooks (other materials may be used). The swivel J-hooks are able to be opened via pressure to clip onto the container-holding-ring and closed when the pressure is released to be form a removable attachment to the container-holding-ring.

The user is able to pour a liquid treat into the cup, couple the combination lid-straw onto the upper periphery of the cup, and place the cup into a freezer to freeze a liquid treat, and after a duration of time passes, the user is able to remove the cup from the freezer and enjoy the frozen treat as a popsicle via the straw-upper-section serving as a handle. The user is also able to use the spoon-end of the straw-lower-section for eating the frozen treat while the frozen treat is still in a frozen state as desired. The user is also able to drink the treat as it thaws via the straw-upper-section and the straw-lower-section serving as a straw. The cup is able to be carried by a user in a hands-free condition using the container-holding-ring and the lanyard-assembly.

The present invention holds significant improvements and serves as a frozen treat mold system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, frozen treat mold system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a frozen confection holder and more particularly to a frozen treat mold system as used to improve the ability to conveniently eat (consume) a frozen confection using a container for a frozen treat allowing the treat to be consumed in a frozen state as a popsicle as well as allowing the treat to be consumed in a melted state via a straw.

Generally speaking, many people enjoy a frozen treat, especially on a hot day. However, it is often difficult to consume a regular popsicle on a stick without it melting and possibly causing a mess. Children, especially, may have a difficult time consuming a popsicle and often end up wasting a portion of it through melting and possible loss of the treat via it falling off a stick. The frozen treat mold system disclosed herein allows users of all ages to enjoy their frozen treat even as it melts because the user is able to return the melting treat to its container and consume it with either a straw or with a spoon included on a straw lower section. The present invention serves to solve the aforementioned problems in a cost-effective manner.

Figure 1:
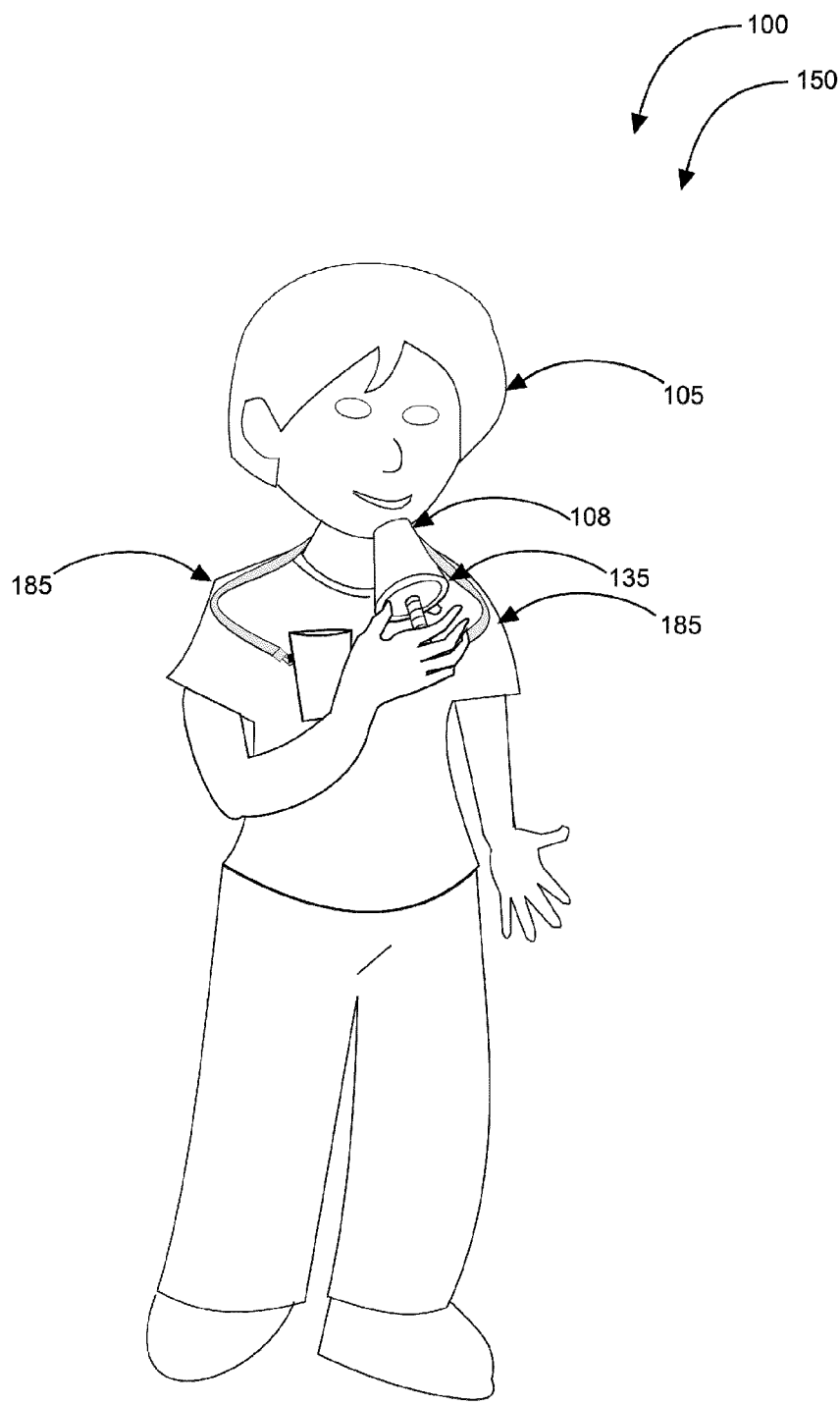
FIG. 1 shows a perspective view illustrating a frozen treat mold system in an in-use condition according to an embodiment of the present invention.

Referring to the drawings by numerals of reference there is shown in FIG. 1, a perspective view illustrating frozen treat mold system 100 in an in-use condition 150 according to an embodiment of the present invention.

Frozen treat mold system 100 preferably comprises frozen-treat-mold-assembly 110 comprising container housing 115 having cup 117 with inner volume 121 and outer-surface 125. Container housing 115 comprises flexible mold 133 for freezing flavored liquids (therein) into a frozen state thereby comprising frozen treat 108 (solid not liquid). Frozen-treat-mold-assembly 110 further comprises combination-lid-straw 135. Combination lid-straw 135 comprises in combination straw-upper-section 137 with top hole 140, container-lid 144 having lifting tab 148, straw-lower-section 155 with bottom-hole 157 having spoon-end 159, and straw-cap 170 having cap-opening 171, cap-volume 172, and retaining-clip 173. Retaining-clip 173 comprises retaining-clip-opening 174 able to fit about top-portion 141 of straw-upper-section 137 fitted between clip-top-lug 175 and clip-bottom-lug 176. Clip-top-lug 175 and clip-bottom-lug 176 hold retaining-clip 173 in place on straw-upper-section 137.

User 105 is able to pour a liquid treat into cup 117, couple combination lid-straw 135 onto upper periphery 119 of cup 117, and place cup 117 into a freezer to freeze the liquid treat, and after a duration of time passes, user 105 is able to remove cup 117 from the freezer and enjoy frozen treat 108 as a popsicle via straw-upper-section 137 serving as handle 138. User 105 is also able to use spoon-end 159 of straw-lower-section 155 for eating frozen treat 108 while frozen treat 108 is still in a frozen state as desired. User 105 is also able to drink the liquid treat as it thaws via straw-upper-section 137 and straw-lower-section 155 serving as a straw (in non-solid embodiments) by returning frozen treat 108 to inner volume 121 of cup 117 for further consumption. Cup 117 is able to be carried by user 105 in a hands-free condition using container-holding-ring 180 and lanyard-assembly 185.

Figure 2:
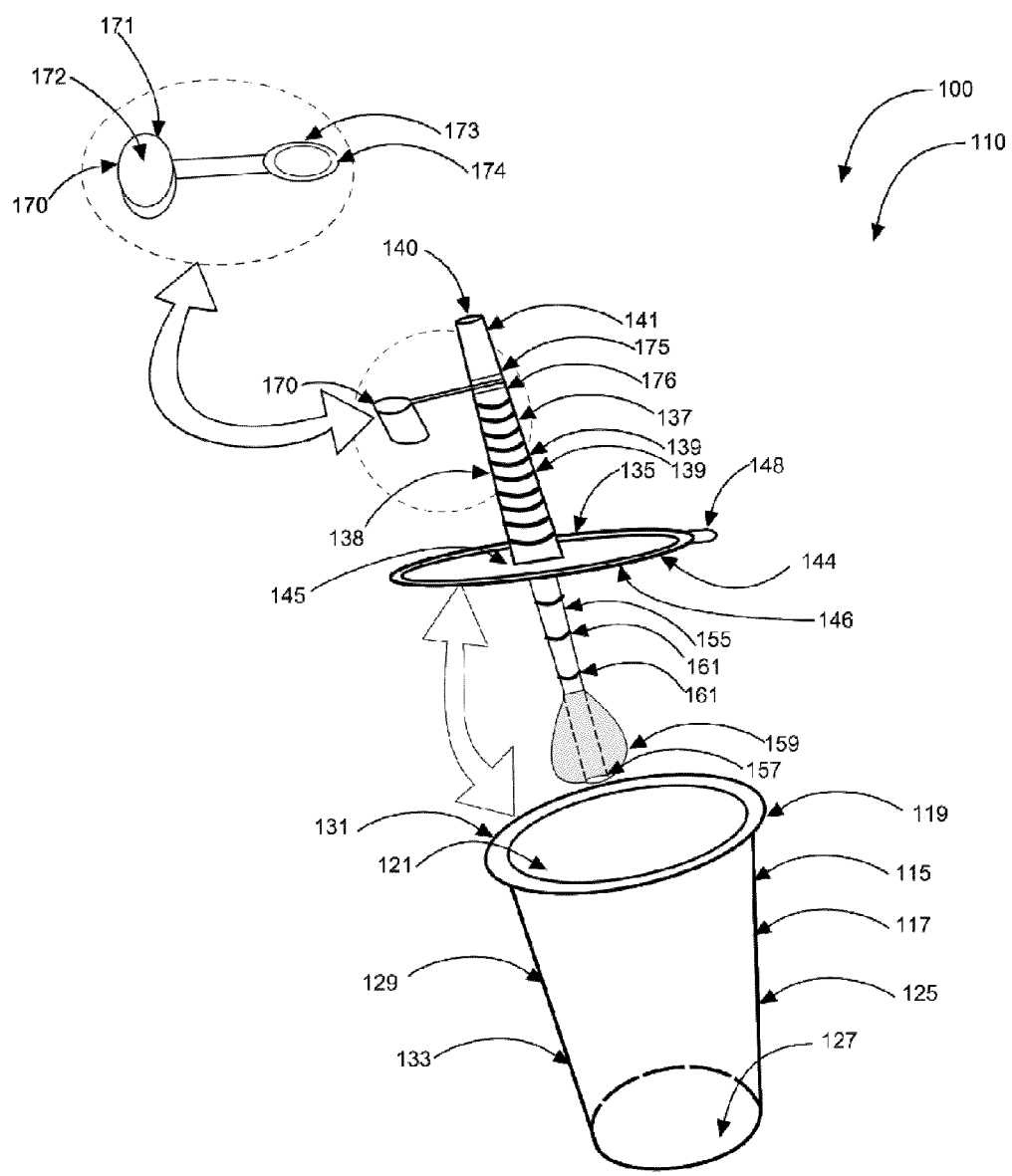
FIG. 2 is a perspective view illustrating a container housing and a combination lid-straw according to an embodiment of the present invention of FIG. 1.

Referring now to FIG. 2, a perspective view illustrating container housing 115 and combination lid-straw 135 according to an embodiment of the present invention of FIG. 1.

Outer surface 125 of container housing 115 comprises round bottom-surface 127, side 129 incliningly-rising from round bottom-surface 127, and top-opening 131. Top-opening 131 is inclined suitably for opening with relative ease despite expansion of the liquid treat when frozen because of decreased surface area of inner volume 121 contacting frozen treat 108 as being removed due to side 129 incliningly-rising from round bottom-surface 127. Container housing 115, comprising flexible molded plastic is suitable to contain and form the liquid treat when frozen and, through flexing container housing 115, able to loosen the contents so frozen treat 108 may be consumed as a popsicle when it is removed from container housing 115. Container housing 115 in preferred embodiments comprises a 10 ounce cup 117 and other smaller size cups 117 are available for toddlers and smaller children and larger size cups 117 to provide frozen treats 108 in a large size and a jumbo size.

Combination lid-straw 135 comprises a combination lid, drip-catcher, spoon, straw, and handle of made of rigid material allowing straw-upper-section 137 with top hole 140 to serve as handle 138 allowing user 105 to eat frozen treat 108 as a popsicle. Straw-upper-section 137 of combination lid-straw 135 comprises plurality of handle-ridges 139 evenly spaced along straw-upper-section 137 providing a ridged surface enabling user 105 to tightly grip straw-upper-section 137. Use of handle 138 allows user 105 to enjoy frozen treat 108 without touching frozen treat 108 while bottom side 146 of container-lid 144 catches dripping from frozen treat 108 as it melts, thereby eliminating sticky hands. Combination lid-straw 135 is removably attachable to upper periphery 119 of outer-surface 125 of cup 117 via placing container-lid 140 having lifting tab 142 on upper-periphery 123 of outer-surface 126, with lifting tab 144 being useful for removing container-lid 144 from cup 117 as desired. Lifting tab 144 is contoured such that it is useful as a pouring spout for pouring melted frozen treat 108 drippings on bottom side 146 of container-lid 144 back into cup 117.

Straw-upper-section 137 with top hole 140 is attached to top-side 145 of container-lid 144 having lifting tab 148, and straw-lower-section 155 with bottom-hole 157 having spoon-end 159 is attached to bottom-side 146 of container-lid 144. Both straw-upper-section 137 with top hole 140 and straw-lower-section 155 with bottom-hole 157 having spoon-end 159 are hollow allowing user 105 to consume the treat as a liquid treat after returning the treat to inner volume 121 of cup 117. Thus, straw-upper-section 137 with top hole 140 and straw-lower-section 155 with bottom-hole 157 having spoon-end 159 may be used in the capacity of a straw for consuming frozen treat 108 as it thaws.

In an alternate embodiment, straw-upper-section 137 and straw-lower-section 155 are solid in configuration rather than hollow, thus providing even greater rigidity to straw-upper-section 137 and straw-lower-section 155 when using spoon-end 159 for scooping out frozen treat 108 from inner volume 121 of container housing 115. In this embodiment, top hole 140 and bottom-hole 157 are not included in combination-lid-straw 135.

Spoon-end 159 of straw-lower-section 155 with bottom-hole 157 is contoured in such a manner as to allow user 105 to scoop a portion of frozen treat 108 on spoon-end 159 for consumption. Straw-cap 170 is removably attachable to top-portion 141 of straw-upper-section 137 to prevent spilling contents of cup 117 via inserting top hole 140 of the straw-upper-section 137 into cap-volume 172 and attaching retaining-clip 173 to straw-upper-section 137. Retaining-clip 137 is held in place on top-portion 141 of straw-upper-section 137 via tension.

Figure 3:
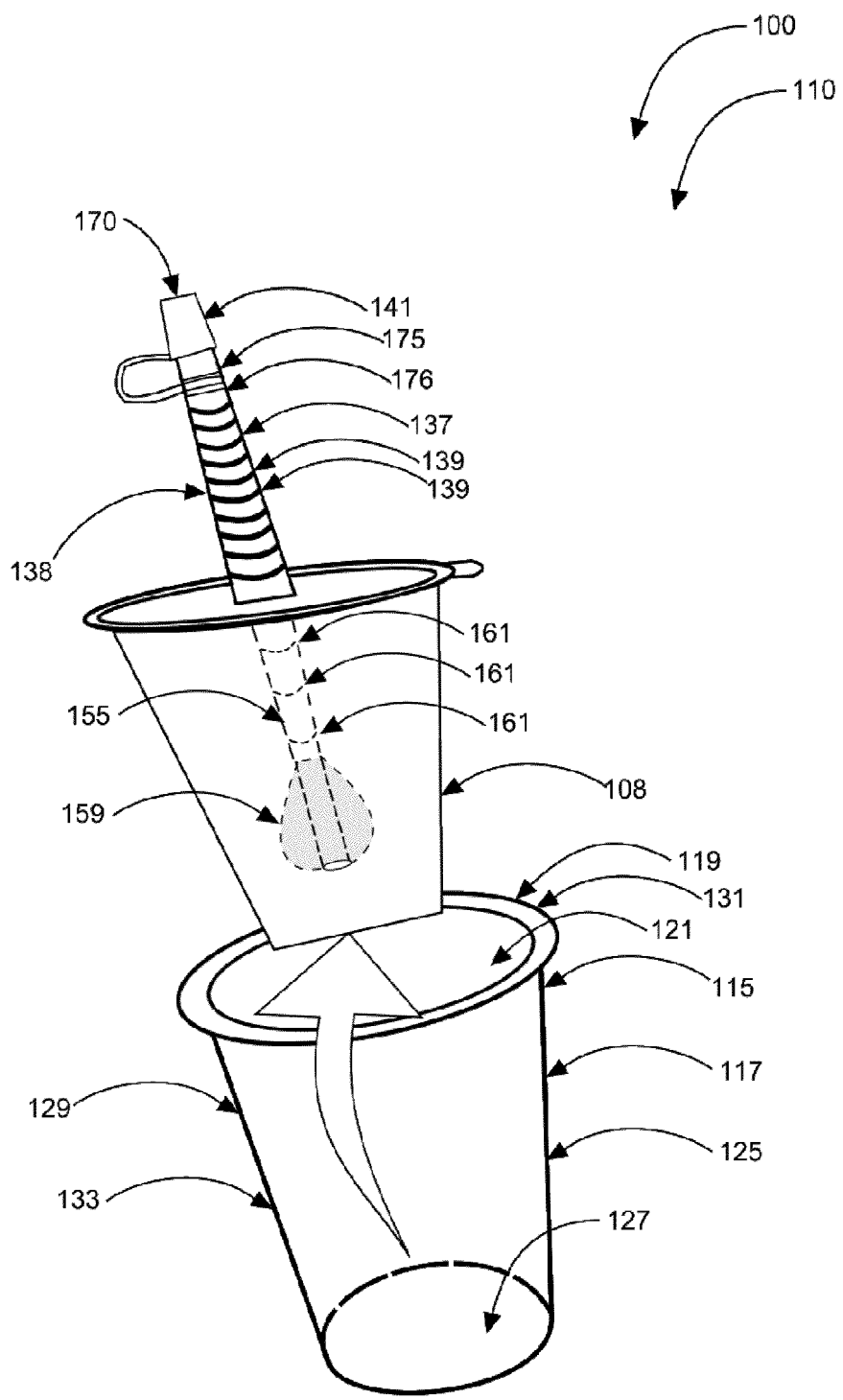
FIG. 3 is a perspective view illustrating a frozen-treat-mold-assembly with a frozen treat frozen onto a straw-lower-section according to an embodiment of the present invention of FIG. 1.

Referring now to new FIG. 3, a perspective view illustrating frozen-treat-mold-assembly 110 with frozen treat 108 frozen onto straw-lower-section 155.

Straw-lower-section 155 with bottom-hole 157 having spoon-end 159 comprises plurality of mold-holding-ridges 161 such that as the liquid treat freezes, it solidifyingly-forms about straw-lower-section 155 and plurality of mold-holding-ridges 161 in a manner to securely hold frozen treat 108 for consumption.

Figure 4:
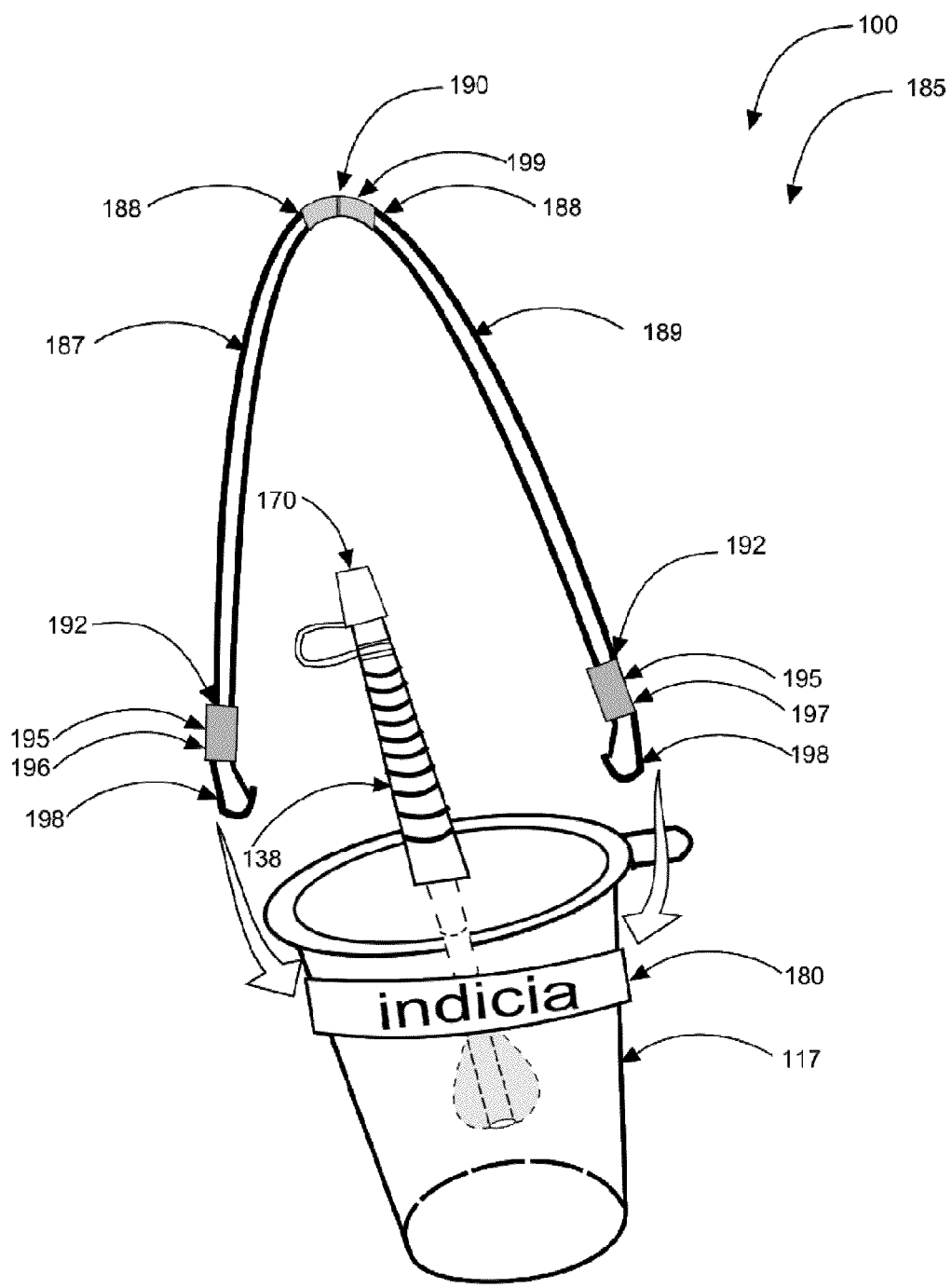
FIG. 4, is a perspective view illustrating the frozen-treat-mold-assembly, including a container-holding-ring and a lanyard-assembly according to an embodiment of the present invention of FIG. 1.

Referring now to FIG. 4, a perspective view illustrating frozen-treat-mold-assembly 110, container-holding-ring 180, and lanyard-assembly 185 according to an embodiment of the present invention of FIG. 1.

Frozen treat mold system 100 may further comprise container-holding-ring 180 and lanyard-assembly 185 to serve as a carrier for container housing 115. Container-holding-ring 180 comprises flexible (silicone-like) material able to fit around a perimeter of container housing 115 as a sheath thereby allowing container housing 115 to be carried in a hands-free manner when used with lanyard-assembly 185.

Lanyard-assembly 185 comprises strap 187, and pair of holding-clasps 195. Strap 187 comprises two lengths 189, each of lengths 189 having corresponding release mechanism 199 on joining-end 191, and terminal-clasp-end 192, respectively, thereby defining strap 187. Each of release mechanisms 199 on lengths 189 of strap 187 are joined together at mid-point 190 of an overall length of straps 187 during normal use, and are releasable from each other when lanyard-assembly 185 needs to be removed from user 105 in a quick manner.

Each of pair of holding-clasps 195 comprise first-clasp 196 attached to one of terminal-clasp-ends 192 and second-clasp 197 attached to one of terminal-clasp-ends 192. Each of holding-clasps 195 comprise plastic swivel J-hooks 198. Swivel J-hooks 198 are able to be opened via pressure to clip onto container-holding-ring 180 and closed when the pressure is released to form a removable attachment to container-holding-ring 180.

Figure 5:
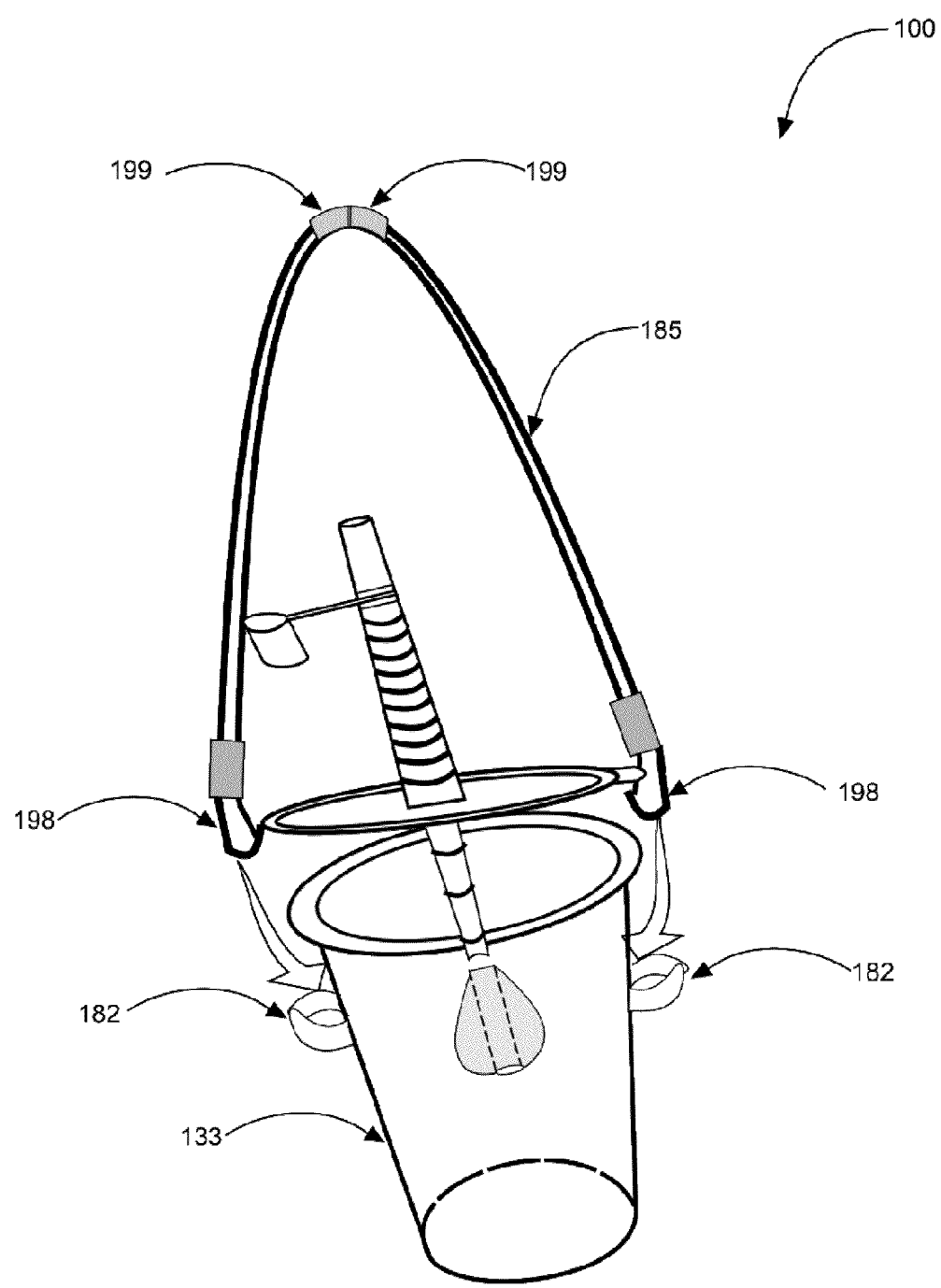
FIG. 5 is a perspective view illustrating the frozen-treat-mold-assembly and container housing having loops on a side of an outer-surface and the lanyard-assembly according to an embodiment of the present invention of FIG. 1.

Referring now to FIG. 5, a perspective view illustrating frozen-treat-mold-assembly 110 and container housing 115 having loops 182 on side 129 of outer-surface 127, and lanyard-assembly 185 according to an embodiment of the present invention of FIG. 1.

In an alternate embodiment, frozen treat mold system 100 comprises a pair of molded plastic loops 182. Each of pair of loops 182 are attached to opposite sides 129 of outer-surface 125 of container housing 115. In this embodiment, user 105 is able to removably attach each of pair of holding-clasps 195 of lanyard-assembly 185 to each of pair of loops 182 thereby allowing container housing 115 to be carried in a hands-free manner.

Figure 6:
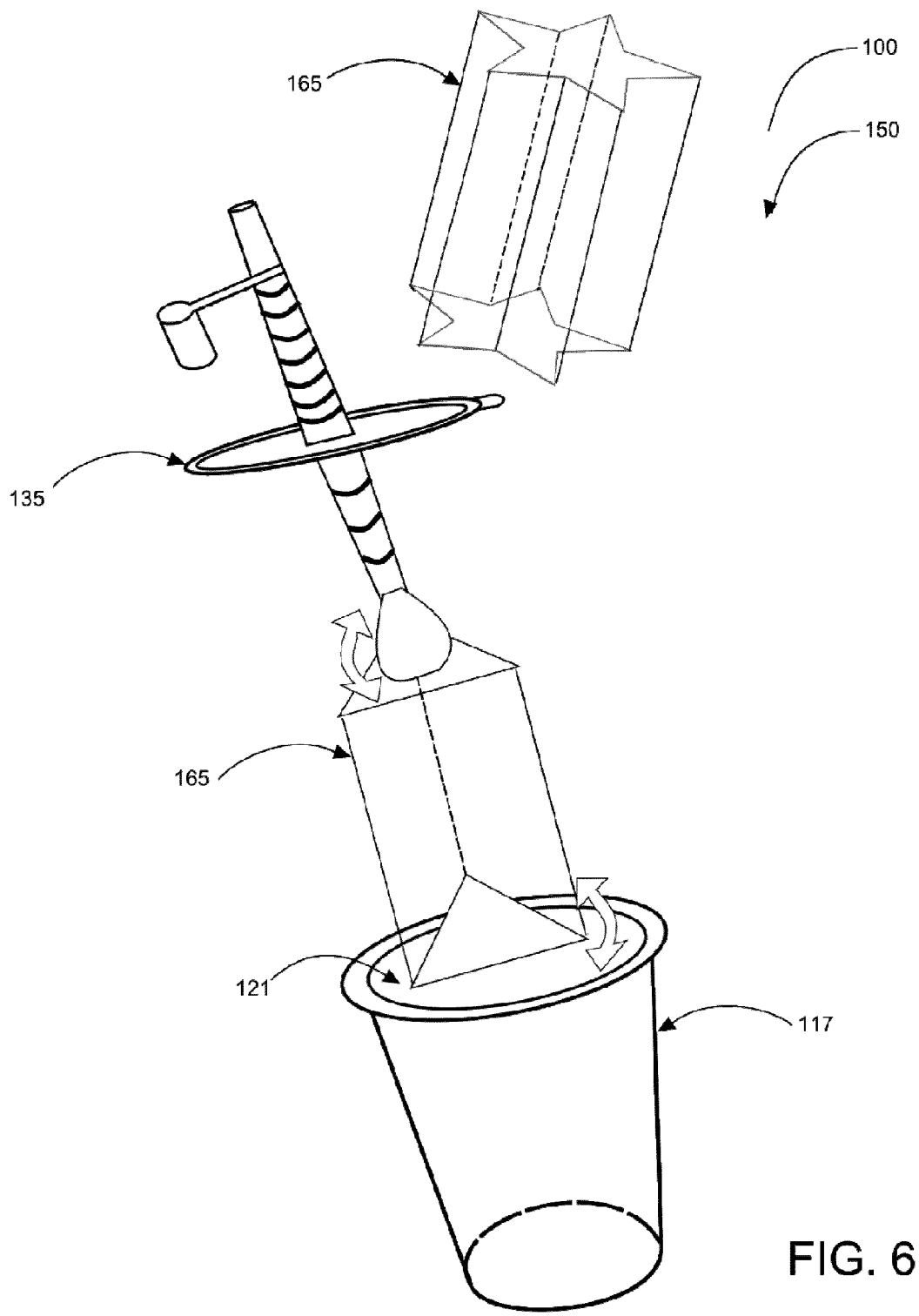
FIG. 6 is a perspective view illustrating novelty shape molds to be inserted into a container-housing according to an embodiment of the present invention of FIG. 1.

Referring now to FIG. 6, a perspective view illustrating novelty shape molds 165 to be inserted into container-housing 115 according to an embodiment of the present invention of FIG. 1.

In an alternate embodiment, frozen treat mold system 100 comprises novelty shape molds 165 selected from the group consisting of circles, squares, triangles and stars comprising flexible (silicon-like) material for insertion into inner volume 121 of container housing 115 allowing user 105 to enjoy a treat frozen into a novelty shape. In additional alternate embodiments, frozen treat mold system 100 further comprises novelty shape molds 165 in the shapes of cartoon-characters and action figures comprising flexible (silicon-like) material for insertion into inner volume 121 of container housing 115 allowing user additional choices for enjoying frozen treat 108. Novelty shape molds 165 may consist of a virtually unlimited variety of shapes not limited to star, circle, square, or triangle. Novelty shape molds 165 may be made of various suitable materials.

Frozen treat mold system 100 may be sold as a kit comprising the following parts: at least one container housing 115, at least one combination lid-straw 135 (sealing lid and cap), and at least one set of user instructions including a recipe and fill instructions. At least one novelty shape mold 165 may also be included in the kit. At least one container-holding-ring 180 and at least one lanyard-assembly 185 may be included in the kit. Container housing 115 may be provided in a variety of sizes.

Frozen treat mold system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 7:
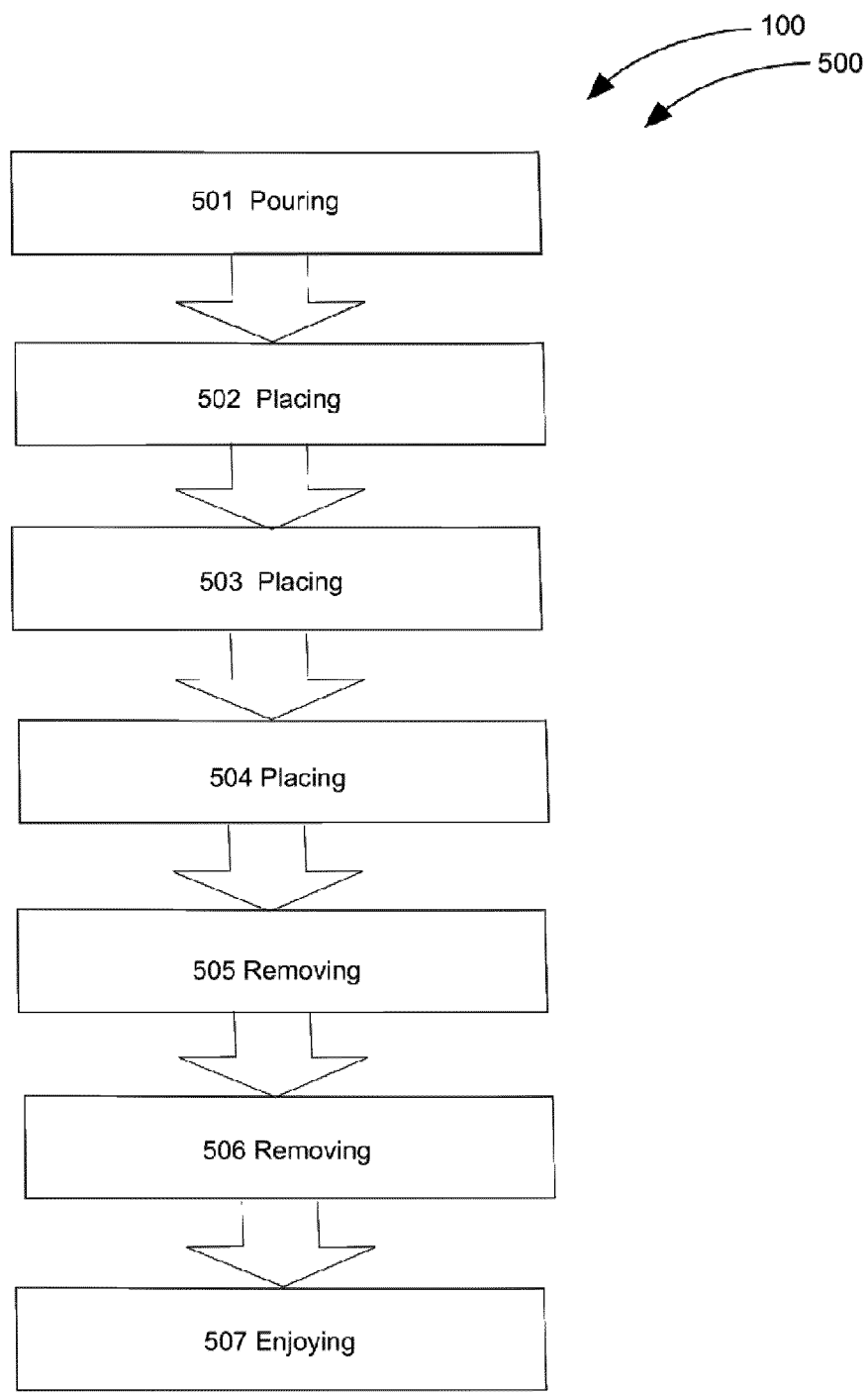
FIG. 7 shows a flowchart illustrating method of use for the frozen treat mold system according to an embodiment of the present invention of FIGS. 1-6.

Referring now to FIG. 7, a flowchart illustrating method of use 500 for frozen treat mold system 100 according to an embodiment of the present invention of FIGS. 1-6.

Method of use 500 for frozen treat mold system 100 preferably comprises the steps of: step one 501 pouring a flavored liquid into container housing 115, step two 502 placing combination lid-straw 135 on container housing 115, step three 503 placing straw-cap 170 on straw-upper-section 137 to cover top hole 140, step four 504 placing frozen-treat-assembly 110 into a freezer, step five 505 removing frozen-treat-assembly 110 from the freezer after the flavored liquid has frozen onto straw-lower-section 155, step six 506 removing combination lid-straw 135 from container housing 115 via lifting tab 148; and step seven 507 enjoying a frozen treat contained on straw-lower-section 155.

It should be noted that the steps described in the method of use can be carried out in many different orders according to user preference. The use of "step of" should not be interpreted as "step for", in the claims herein and is not intended to invoke the provisions of 35 U.S.C. §112, §6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A frozen treat mold system for creating and holding a frozen liquid in position for consumption, said frozen treat mold system comprising:
   a frozen-treat-mold-assembly having:
      a container housing comprising a cup with an inner volume and an outer-surface; and
      a combination lid-straw comprising:
         a straw-upper-section with a top hole;
         a container-lid having a lifting tab;
         a straw-lower-section with a bottom-hole having a spoon end and a plurality of spaced mold-holding-ridges extending around a circumference of said straw-lower-section such that as said liquid treat freezes, said frozen liquid forms about said straw-lower-section, and said mold-holding-ridges in a manner that said straw lower section and said plurality of mold-holding-ridges configured to securely hold said frozen liquid upon said straw-lower-section when said lid-straw and said frozen liquid are lifted out of said container housing and held in position for consumption; and
         a straw-cap having a cap-opening, a cap-volume, and a retaining-clip;

wherein said combination lid-straw is removably attachable to an upper portion of said outer-surface of said cup via placing said container-lid having said lifting tab on an upper-periphery of said outer-surface, said lifting tab being useful for removing said container-lid from said cup as needed;

wherein said straw-upper-section with said top hole is attached to a top-side of said container-lid having said lifting tab and said straw-lower-section with said bottom-hole having said spoon-end which is attached to a bottom-side of said container-lid;

wherein said spoon-end is hollow allowing said straw-upper-section with said top hole and said straw-lower-section with said bottom hole having said spoon-end to be used in a capacity of a straw for consuming said frozen treat as said frozen treat thaws, wherein said spoon-end of said straw-lower-section with said bottom-hole is curved configured to allow said user to scoop a portion of said frozen treat for consumption;

wherein a user is able to pour a liquid treat into said cup, couple said combination lid-straw onto said upper periphery of said cup, and place said cup into a freezer to freeze said liquid treat, and after a duration passes said user is able to remove said cup from said freezer and drink said frozen treat via said straw-upper-section as said frozen treat melts, and said user is able to use said spoon-end of said straw-lower-section for eating said frozen treat while said frozen treat is still in a frozen state as needed.

2. The frozen treat mold system of claim 1, wherein said container housing comprises molded plastic suitable to contain and form said liquid treat when frozen.

3. The frozen treat mold system of claim 2, wherein said container housing comprises a flexible mold for freezing flavored liquids into a frozen state to comprise said liquid treat.

4. The frozen treat mold system of claim 3, wherein said frozen treat mold system further comprises shaped-molds selected from the group consisting of circles, squares, triangles and stars for insertion into said container housing.

5. The frozen treat mold system of claim 1, wherein said straw-upper-section of said combination lid-straw comprises a plurality of handle-ridges evenly spaced along said straw-upper-section providing a ridged surface enabling said user to tightly grip said straw-upper-section.

6. The frozen treat mold system of claim 1, wherein said frozen treat mold system further comprises a container-holding-ring to serve as a carrier for said container housing.

7. The frozen treat mold system of claim 6, wherein said container-holding-ring comprises flexible material able to fit around a perimeter of said container housing thereby allowing said container housing to be carried in a hands-free manner.

8. The frozen treat mold system of claim 1, wherein said frozen treat mold system further comprises a lanyard-assembly comprising a strap, and a pair of holding-clasps.

9. The frozen treat mold system of claim 8, wherein said strap comprises two lengths, each of said lengths having a corresponding release mechanism on a joining-end and a terminal-clasp-end, respectively.

10. The frozen treat mold system of claim 9, wherein each of said release mechanisms on said lengths of said strap are joined together at a mid-point of an overall length of said strap during normal use and are releasable from each other, as needed.

11. The frozen treat mold system of claim 9, wherein said pair of holding-clasps comprise a first-clasp attached to one of said terminal-clasp-ends and a second-clasp attached to one of said terminal-claps-ends.

12. The frozen treat mold system of claim 11, wherein each of said holding-clasps comprise plastic swivel J-hooks.

13. The frozen treat mold system of claim 1, wherein said frozen treat mold system further comprises a pair of loops, each of said pair of loops attached to said side of said container housing.

* * * * *